H. C. Mapes.
Horse Hay-Fork.
No. 77299 — Patented Apr. 28, 1868
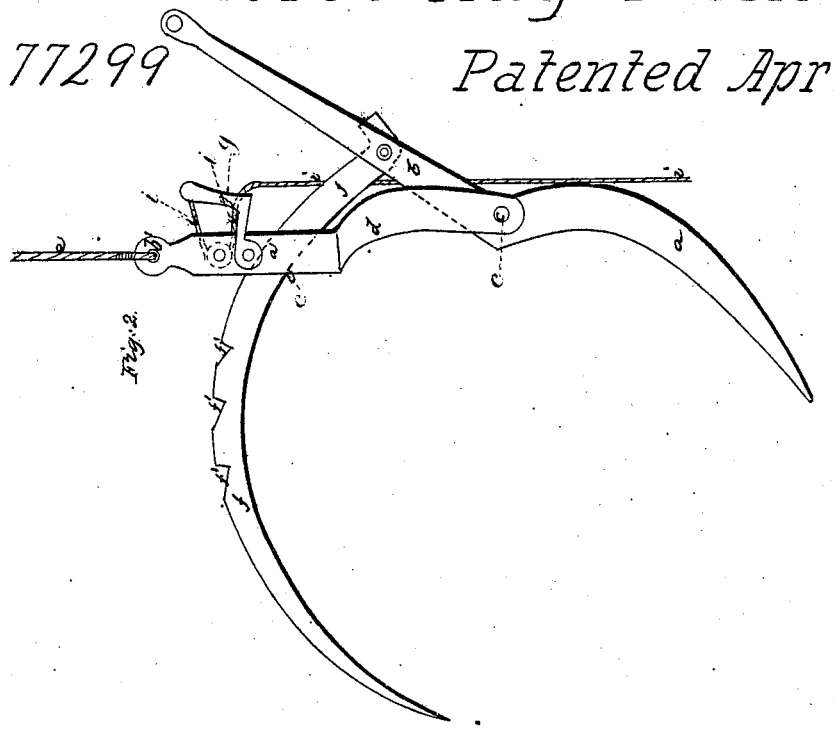
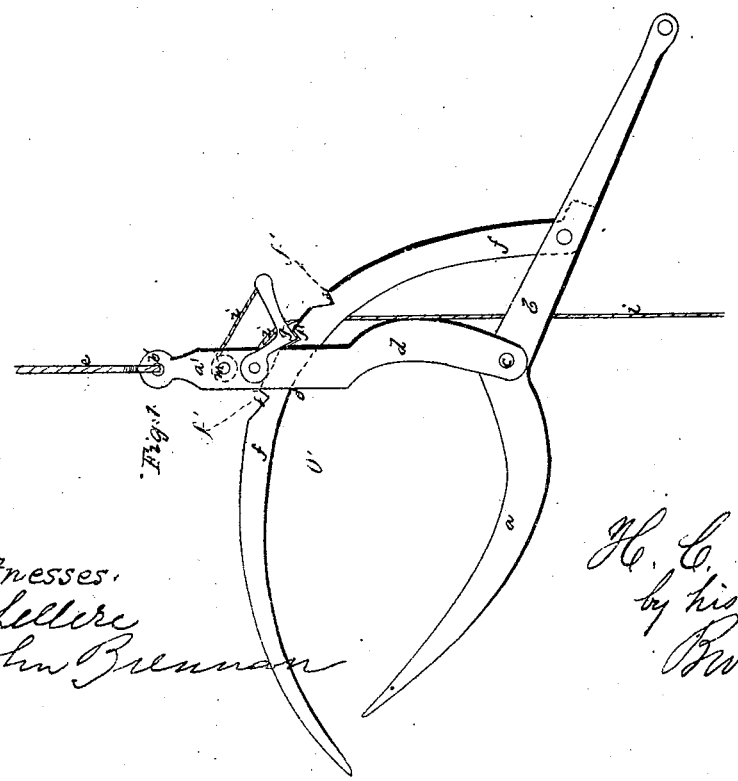

United States Patent Office.

H. COLLINS MAPES, OF RUSHVILLE, NEW YORK.

*Letters Patent No. 77,299, dated April 28, 1868.*

---

IMPROVEMENT IN HORSE HAY-FORKS.

---

*The Schedule referred to in these Letters Patent and making part of the same.*

---

TO ALL WHOM IT MAY CONCERN:

Be it known that I, H. COLLINS MAPES, of Rushville, in the county of Ontario, and State of New York, have invented a new and useful Improvement in Horse Hay-Elevators; and I do hereby declare that the following is a full, clear, and exact description of the same, reference being had to the accompanying drawings, making a portion of this specification, in which—

Figure 1 is a side view of a hay-elevator or fork constructed according to my invention, showing the same in a closed condition, as when raising the hay.

Figure 2 is a side view of the same in an open condition, preparatory to being loaded with the hay to be raised.

Similar letters of reference indicate corresponding parts in both figures.

The object of this invention is to provide a horse-fork which will be simple, strong, and durable in construction, and which, furthermore, may not only be very conveniently handled when in use, but which will also hold the hay, while raising the same, with very great tenacity; the invention consisting in a novel arrangement of parts, whereby the desired object is effectually secured.

To enable others to understand the construction and operation of my invention, I will proceed to describe it with reference to the drawings.

The tines of the fork are indicated at $a$, and are united at their rear or inner ends to a suitable handle, $b$, in any appropriate manner, and preferably strengthened by a transverse brace or bar, $c$, situated at a little distance forward of the junction of the tines with the handle. Pivoted to the outermost tines is a bail, $d$, the upper part, $a'$, of which may be formed into a kind of bar, having an eye, $b'$, in its upper end, in which is secured the end of the draught-rope $e$, and which is also furnished with a longitudinal slot, at or about the point indicated at $c'$ in the drawings, through which passes a curved clamping-tine, $f$, which is pivoted to the handle $b$ by a pivot, $e'$, and extends forward over the tines $a$ in the manner represented in the figures.

Pivoted to the upper part of the bar $a'$ of the bail $d$ is an elbow-shaped catch, $g$, which has attached to its upper extremity a tripping-cord, $i$, passing over a pulley, $m$, placed in a suitable slot or recess in the bar $a'$, just mentioned, and thence downward to the hand of the operator or attendant when the fork is used.

The upper side of the clamping-tine is provided with one or more notches, $f'$, in such a way that when the bail is pushed forward, and the catch $g$ is fitted into one of the notches $f'$, the aforesaid clamping-tine will act as a brace to hold the tines $a$ rigid, with reference to the bail $d$, at the same time that the said clamping-tine is firmly held down, at a greater or less distance from the tines $a$, over which it extends, according as the notch into which the catch $g$ is fitted is situated at a greater or less distance from the forward end of the clamping-tine.

In using the fork, it is taken in the open condition, shown in fig. 2, and the tines, $a$, thereof are thrust into the hay, straw, or such like material to be elevated, whereupon the bail $d$ is pushed forward, and the catch $g$ is fitted into one of the notches $f'$, as hereinbefore fully set forth, thereby clamping the hay upon the fork snugly between the tines $a$ and clamping-tine $f$, and firmly and securely holding the same while being raised, by the usual appliances operating the draught-rope.

When the fork with its load is raised to the desired height, the tripping-cord $i$ is pulled, which, by bringing the catch out of the notch in the clamping-tine, allows the weight of the load aforesaid to tilt the tines $a$, and be discharged therefrom, the fork being thus brought into the open condition shown in fig. 2, preparatory to a repetition of the loading and elevating-operations.

If desired, a spring may be so applied to the catch $g$ as to press the same down upon the clamping-tine, in order to facilitate the action thereof in holding the said tine.

What I claim as my invention, and desire to secure by Letters Patent, is—

The catch $g$ and the clamping-tine $f$, formed with notches $f'$, arranged in relation with each other, and with the bail $d$, tines $a$, and handle $b$; substantially as and for the purpose specified.

H. COLLINS MAPES.

Witnesses:
 JOHN SAYRE,
 JOHN C. THOMAS.